(12) United States Patent
Katano

(10) Patent No.: US 6,471,407 B1
(45) Date of Patent: Oct. 29, 2002

(54) ROLLING BEARING UNIT FOR SUPPORTING WHEEL

(75) Inventor: Kaoru Katano, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/613,836

(22) Filed: Jul. 11, 2000

(30) Foreign Application Priority Data

Jul. 12, 1999 (JP) .......................................... 11-196957

(51) Int. Cl.[7] .............................................. F16C 32/00
(52) U.S. Cl. ...................................... 384/448; 384/624
(58) Field of Search ................................. 384/448, 624

(56) References Cited

U.S. PATENT DOCUMENTS

| | | | |
|---|---|---|---|
| 4,278,881 A | 7/1981 | Mann | 250/227 |
| 4,924,180 A | 5/1990 | Nasr et al. | 324/207.15 |
| 4,988,979 A | 1/1991 | Sasaki et al. | 340/683 |
| 5,423,218 A | 6/1995 | Matsuzaki | 73/593 |
| 5,509,310 A * | 4/1996 | El-Ibiary | 384/448 X |
| 5,557,552 A * | 9/1996 | Naito et al. | 364/565 |
| 5,585,577 A * | 12/1996 | Lemoine et al. | 384/448 X |
| 5,677,488 A * | 10/1997 | Monahan et al. | 73/593 |
| 6,161,962 A * | 12/2000 | French et al. | 384/459 |

FOREIGN PATENT DOCUMENTS

| | | |
|---|---|---|
| DE | 32 01 811 A1 | 9/1983 |
| DE | 195 22 543 | 2/1996 |
| DE | 44 42 355 A1 | 5/1996 |
| EP | 0 378 939 | 7/1990 |
| JP | 63-171364 | 7/1988 |
| JP | 5-319008 | 12/1993 |
| JP | 6-115414 | 4/1994 |
| JP | 2543369 | 4/1997 |

* cited by examiner

Primary Examiner—Thomas R. Hannon
(74) Attorney, Agent, or Firm—Crowell & Moring LLP

(57) ABSTRACT

A rolling bearing unit for supporting a wheel, comprising a stationary race which has a stationary peripheral surface formed with a stationary raceway, being not rotatable during use, and supported by a suspension, a rotatable race which has a rotatable peripheral surface formed with a rotatable raceway, being rotatable with the wheel fixed thereto, rolling elements which are rotatably provided between the stationary raceway and rotatable raceway, a vibration sensor which is supported by the stationary race, a sensor rotor swhich is upported by the rotatable race and has circumferential characteristics changing alternately and a rotation speed sensor which is supported by the stationary race and has a detection portion facing the sensor rotor.

17 Claims, 10 Drawing Sheets

ROLLING BEARING UNIT FOR SUPPORTING WHEEL

FIELD OF THE INVENTION

The present invention relates to a rolling-bearing unit for supporting a wheel of an automobile such that it rotates freely with respect to the suspension, as well as detects the rotation condition of the wheel contributing to stable movement of the automobile.

BACKGROUND OF THE INVENTION

The rolling-bearing unit has been used in order to support a wheel of an automobile such that it rotates freely with respect to the suspension. Also, it is necessary to detect the rotation speed (rpm) of the wheel in order to control an anti-lock brake system (ABS) or traction control system (TCS).

Therefore, recently, supporting the wheel such that it rotates freely with respect to the suspension, as well as, detecting the rpm of the wheel, has widely been performed by employing a rolling-bearing unit with rpm sensor in which a rpm detection device has been installed in the rolling-bearing unit.

FIG. 1 shows one example of the prior art construction of the rolling-bearing unit with an rpm sensor for supporting a wheel, used for this purpose. This rolling-bearing unit with rpm sensor for supporting a wheel supports a rotating race or hub 2, that rotates during use in the state where the wheel is attached to the rotating race or hub 2, such that it rotates freely inside an outer race or stationary race 1 that does not rotate during use in the state where it is supported by the suspension.

In addition, it detects the rpm of a sensor rotor 3, that is attached to part of the hub 2, through the use of an rpm detection sensor 5 that is supported by a cover 4 that is attached to the outer ring 1. In the example in the figure, ring-shaped sensor, that faces the sensor rotor 3 all the way around its circumference, is used as this rpm detection sensor 5.

Also, in order to support the hub 2 such that it rotates freely, a plurality of outer-raceways 6 are formed around the inner peripheral surface of the outer race 1. In addition, inner-raceways 9 are formed around the outer peripheral surface of the hub 2 and around the outer peripheral surface of an inner-race 8 that fits around the hub 2 and is attached to the hub 2 by a nut 7 to form the aforementioned rotating race. Moreover, there is a plurality of rolling elements 10 located between each of the respective inner-raceways 9 and outer-raceways 6 and held by retainers 11, respectively, such that they rotate freely, and they rotatably support the hub 2 and inner race 8 inside the outer race 1.

On the axially outer end of the hub 2 (the end on the outside in the direction of width when installed in the automobile, left end in FIG. 1) a flange 12 is formed on the portion that protrudes in the axial direction from the axially outer end of the outer race 1 for attaching to the wheel. Also, on the axially inner end (the end on the inside in the direction of width when installed in the automobile, right end in FIG. 1) there is an installation section 13 for attaching this outer race 1 to the suspension.

The space between the opening on the outer end of the outer race 1 and the outer peripheral surface in the middle of the hub 2 is covered by a seal ring 14. In the case of a rolling-bearing unit for a heavy automobile, tapered rollers may be used in the place of the balls in the figure as the rolling elements 10.

In order that an rpm sensor is installed in this rolling-bearing unit, the sensor rotor 3 is fitted around the outer peripheral surface on the inner end of the axially inner race 8 in the portion away from the inner-raceway 9. This sensor rotor 3 is formed into an entirely ring shape by plastic processing of a magnetic metal plate such as low carbon steel sheet, and comprises a cylindrical section 15 to be detected and a cylindrical section 16 for support that are concentric with each other. Of these, the cylindrical support section 16 is attached to the axially inner end of the inner race 8 by fitting it tightly around the inner end of the inner race 8. Moreover, by forming several slit-shaped through holes in the detected cylindrical section 15 such that they are long in the axial direction of the detected cylindrical section 15 and such that they are uniformly spaced around in the circumferential direction, the magnetic characteristics of the detected cylindrical section 15 changes alternately and uniformly around in the circumferential direction.

Furthermore, the cover 4 is securely fitted on the opening on the inner end of the outer race 1 so as to cover the detected cylindrical section 15 of the sensor rotor 3, and it covers the opening on the axially inner end of the outer race 1. The cover 4 made by plastic processing of sheet metal comprises a cylindrical fitting section 18 that freely fits inside the opening on the axially inner end of the outer race 1, and a cover plate 19 that covers the opening on this inner end. The detection sensor 5 is securely held inside this cover plate 19. There is a through hole 20 formed in an outer peripheral portion of the cover plate 19, and a connector 21 for receiving the output from the rpm detection sensor 5 runs through this through hole 20 to outside the cover 4. With the rpm detection sensor 5 held and attached inside the cover 4 in this way, the detected portion, located on the outer peripheral surface of the rpm detection sensor 5, faces the inner peripheral surface of the detected cylindrical section 15 of the sensor rotor 3 through a small gap therebetween.

When using the rolling-bearing unit with rpm sensor for supporting a wheel described above, the installation section 13 that is formed around the outer peripheral surface of the outer race 1 is fastened to the suspension (not shown) by a bolt (not shown), and a wheel (not shown), is fastened to the flange 12 that is formed around the outer peripheral surface of the hub 2 by fastening the studs 22 formed in the flange 12. In this way, the wheel is rotatably supported with respect to the suspension.

In this state, when the wheel rotates, the area on the end on the detected portion on the rpm detection sensor 5 is alternately passed by the through holes 17 formed in the detected cylindrical section 15 and by the columns located between pairs of adjacent through holes 17 in the circumferential direction. As a result, the density of the magnetic flux that flows inside the rpm detection sensor 5 changes and thus the output of the rpm detection sensor 5 changes. The frequency of the changing output of the rpm detection sensor 5 is proportional to the rpm of the wheel. Therefore, by sending the output from the rpm detection sensor 5 to a controller (not shown), it is possible to sufficiently perform ABS or TCS control.

In other words, the output of the rpm detection sensor 5 is compared with the output of the acceleration sensor located separately on the car body, and when the two sensors do not match in the output thereof, it is determined that slippage is occurring in the area of contact between the outer peripheral surface of the tire and the road surface, and thus ABS or TCS control is performed.

That is, when the deceleration of the wheel found based on the output of the rpm detection sensor 5 is larger than the deceleration of the automobile detected by the acceleration sensor during braking, it is determined that slippage is occurring, and the hydraulic pressure of the wheel cylinder of the brake device is controlled to prevent rotation of the wheel from stopping before the automobile stops, and thus making it possible to maintain stable movement of the automobile.

On the other hand, during acceleration, when the acceleration of the automobile found from the acceleration sensor is smaller than the acceleration of the wheel found based on the output of the rpm detection sensor 5, it is determined that slippage is occurring, and by braking the wheel or throttling (lowering) the engine output, it is possible to prevent slippage between the outer peripheral surface of the tire and the road surface, and to stabilize the movement of the automobile.

With the prior art rolling-bearing unit with rpm sensor for supporting a wheel described above, it is possible to maintain stable movement of the automobile during braking and acceleration, however, in order to be able to maintain stability in more severe conditions, it is necessary to obtain more information of things that will affect the stability of the moving automobile in performing brake of engine control.

On the other hand, in the case of ABS or TCS which uses the prior art rolling-bearing unit with rpm sensor, so-called feedback control, where slippage of the tire with the road surface is detected, is performed for controlling the braking or acceleration. Therefore, braking or engine control is a little delayed, so that improvement is desired from the aspect of performance under severe conditions.

In other words, in the case of the prior art construction, it is not possible to prevent, with the so-called feedforward control, slippage from occurring between the tire and road surface and to prevent, so-called oneside braking, that is caused by extreme differences in braking force on the left and right of the automobile. Furthermore, in the case of a truck or the like with poor load conditions, it is not possible to prevent stability from becoming poor. The rolling-bearing unit for supporting a wheel of this invention, was invented with these problems in mind.

SUMMARY OF THE INVENTION

The present invention provides a rolling bearing unit for supporting a wheel, wherein a vibration sensor and rotation speed sensor are combined to improve stability in acceleration and deceleration.

DETAILED DESCRIPTION OF THE PREFERRED EMBODIMENTS

Similar to the prior art rolling-bearing unit for supporting a wheel described above, the rolling-bearing unit for supporting a wheel of this invention comprises: a stationary race which has stationary raceways around its stationary peripheral surface and that does not rotate when in use and supported by the suspension; a rotating race which has rotating raceways around its rotating peripheral surface and that rotates when in use and attached to the wheel; and a plurality of rolling elements that roll freely between the stationary raceways and rotating raceways.

Particularly, in the rolling-bearing unit for supporting a wheel of this invention, the stationary race is provided with at least one of a vibration sensor for detecting vibration that is applied to the stationary race, or a displacement sensor for detecting the relative displacement between the stationary race and the rotating race.

With the rolling-bearing unit for supporting a wheel of this invention described above, braking and acceleration control is performed according to the information input from the vibration sensor or displacement sensor or both, and furthermore, warnings related to stable movement are issued making it possible to even more efficiently maintain stable movement of the automobile during braking or acceleration and when changing the course.

Now, the present invention is further explained referring to the attached drawings.

Figure 1:
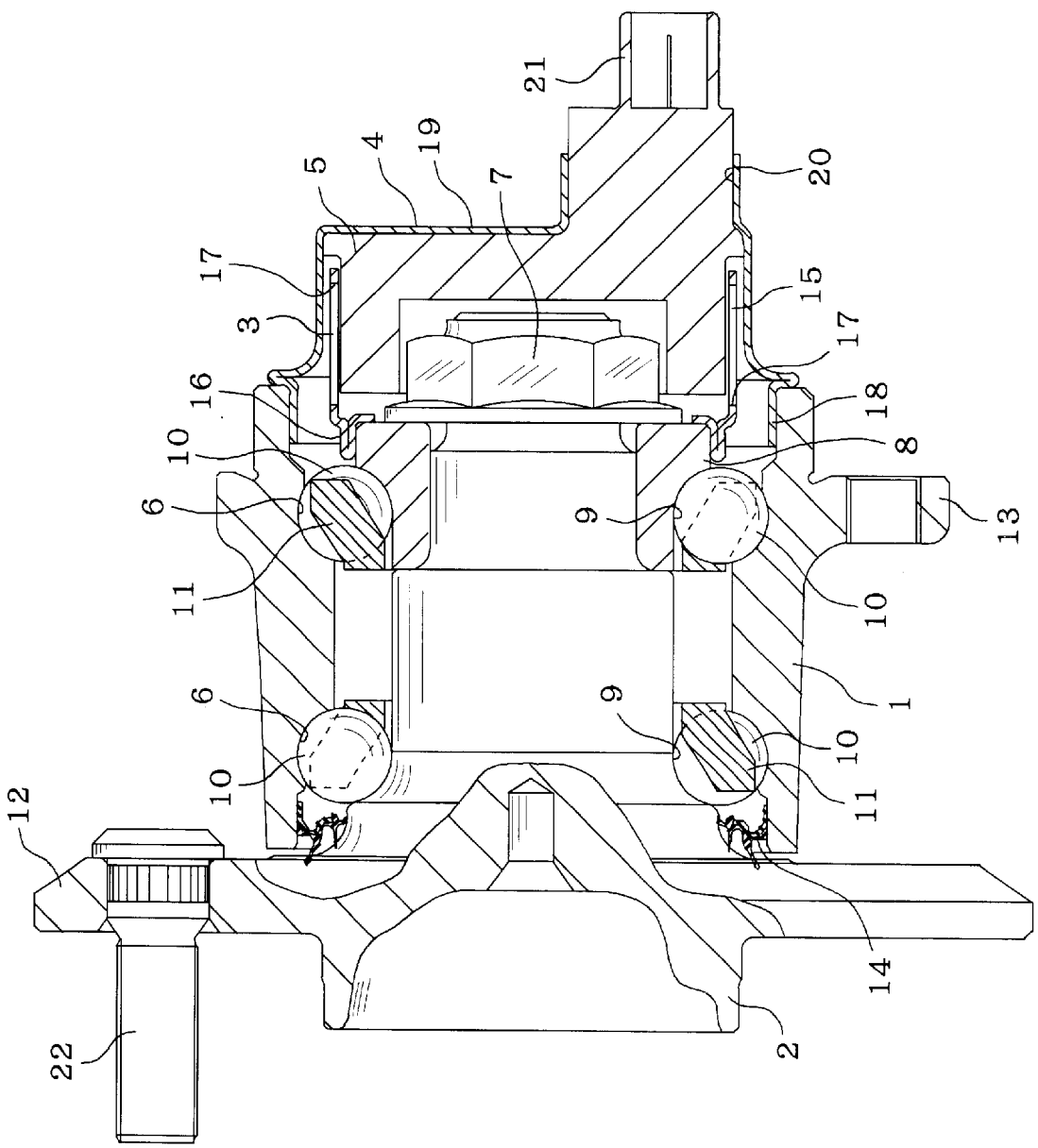
FIG. 1 is a partly cutaway, cross sectional view of a conventional rolling bearing unit for supporting a wheel.
Figure 2:
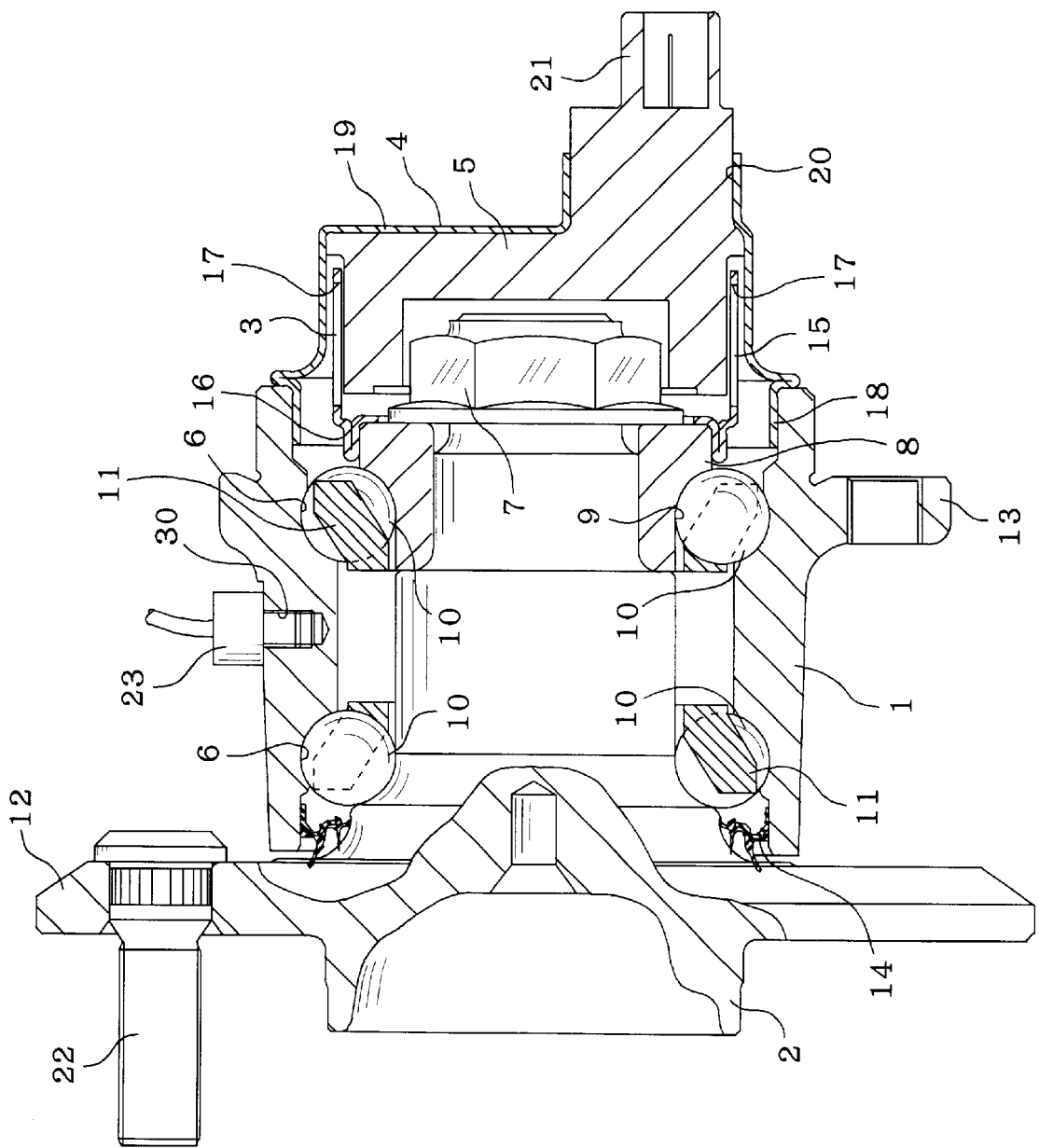
FIG. 2 is a partly cut away, cross sectional view of a rolling bearing unit according to a first example of the embodiment of the present invention.

FIG. 2 shows a first example of the embodiment of the invention. In this example, a vibration sensor 23 is screwed for fixing into a screw hole 30 that is formed on the outer peripheral surface in the middle of the stationary race or the outer race 1. The construction and function of the rolling-bearing unit itself, as well as the construction and function of the unit that detects the rpm (rotation speed) of the wheel that is supported by the hub 2 through the rpm detection sensor 5 and the sensor rotor 3 that is attached to the inner race 8, are substantially the same as the prior art construction shown in FIG. 1 and described above, so any explanation of identical parts will be omitted.

In the case of the rolling-bearing unit for supporting a wheel of this invention, it is possible to know the movement state of the automobile based on the detection signal from the vibration sensor 23, and it is possible to issue warnings to the operator and perform more adequate ABS or TCS control according to this movement state. This is explained further below.

First, performing ABS or TCS control will be explained. During braking or acceleration, the hydraulic pressure inside the wheel cylinder of the brake device and the output power of the engine are controlled based on a signal that expresses the rpm of the wheel that is sent to a controller (not shown in the figure) from the rpm detection sensor 5. Accordingly, premature locking of the wheel (ABS), or idling of the drive shaft (TCS) can be prevented. This function of controlling the hydraulic pressure or engine output power based on the signal from the rpm detection sensor 5 is similar to the prior art rolling-bearing unit with rpm sensor for supporting a wheel described above. In either of these cases, control is performed by feedback control.

On the other hand, the detection signal from the vibration sensor 23 is sent to a controller for performing ABS or TCS control, and is used for ABS or TCS control. However, differing from the detection signal from the rpm detection sensor 5, the detection signal from the vibration sensor 23 is used for feed forward control. In other words, the condition of the road surface, that comes in contact with the outer peripheral surface of the wheel that is supported by the rolling-bearing unit for supporting the wheel in which the vibration sensor 23 is installed, is determined based on the detection signal that is sent from the vibration sensor 23, and the hydraulic pressure or engine power is controlled according to the road condition.

For example, in the case that one side of the automobile in the width direction is on a paved road and the other side is on gravel, or in the case that one side of the automobile is on an icy road and the other side is on dry road, in order that the wheels do not spin during braking or acceleration, it is necessary that the hydraulic pressure sent to the wheel cylinder on the left and right side of the automobile be greatly different, or to control the engine power. In this invention, the controller performs control according to the road conditions, based on the signal from the vibration sensor 23 that is installed in the rolling-bearing unit for supporting a wheel.

In order to do this, data showing the relationship between the vibration and the road condition is input to the microcomputer of the controller. The data that show the relationship between the vibration and road condition can be found through experimentation.

So-called feed forward control is performed, such that the condition of the road surface that comes in contact with the outer peripheral surface of the wheel is determined in advance, so that ABS or TCS control is performed based on those results. Therefore, ABS or TCS control is performed with no time delay. As a result, even when the condition of the road surface that comes in contact with the outer peripheral surface of the left and right wheels is extremely different as described above, there is no slippage between the road and the wheels, and stable attitude can be maintained.

At the instant that movement begins, there is no signal from the vibration sensor 23 for the previous condition, so feed forward control is not performed at the instant that movement begins. Therefore, the output from the vibration sensor just before previous movement stopped is stored in the memory of the controller, and at the instant when movement begins, it is possible to perform TCS control based on that stored data.

Furthermore, it is possible to detect when air pressure in a wheel tire is abnormally low and to warn the operator with a warning light located on the dashboard. Conventionally, a configuration of inputting air pressure to a pressure sensor located in the rolling-bearing unit for supporting a wheel to determine whether or not the air pressure was adequate, was proposed. However, there were many problems such as that construction of a seal for preventing air leakage is difficult, so it has not been used.

On the contrary, by experimentally finding the changes in vibration corresponding to changes in air pressure while the automobile is moving, and by constructing a warning system that will warn when this air pressure has dropped excessively, it is possible to make a practical air-pressure warning device.

In the case of this first example, by attaching the vibration sensor 23 directly to the outer race 1, the precision of detecting difference in vibration based on the rolling friction between the outer peripheral surface of the wheel and the road surface is higher than when the vibration sensor is supported by the cover, making it possible to perform more highly precise control.

Figure 3:
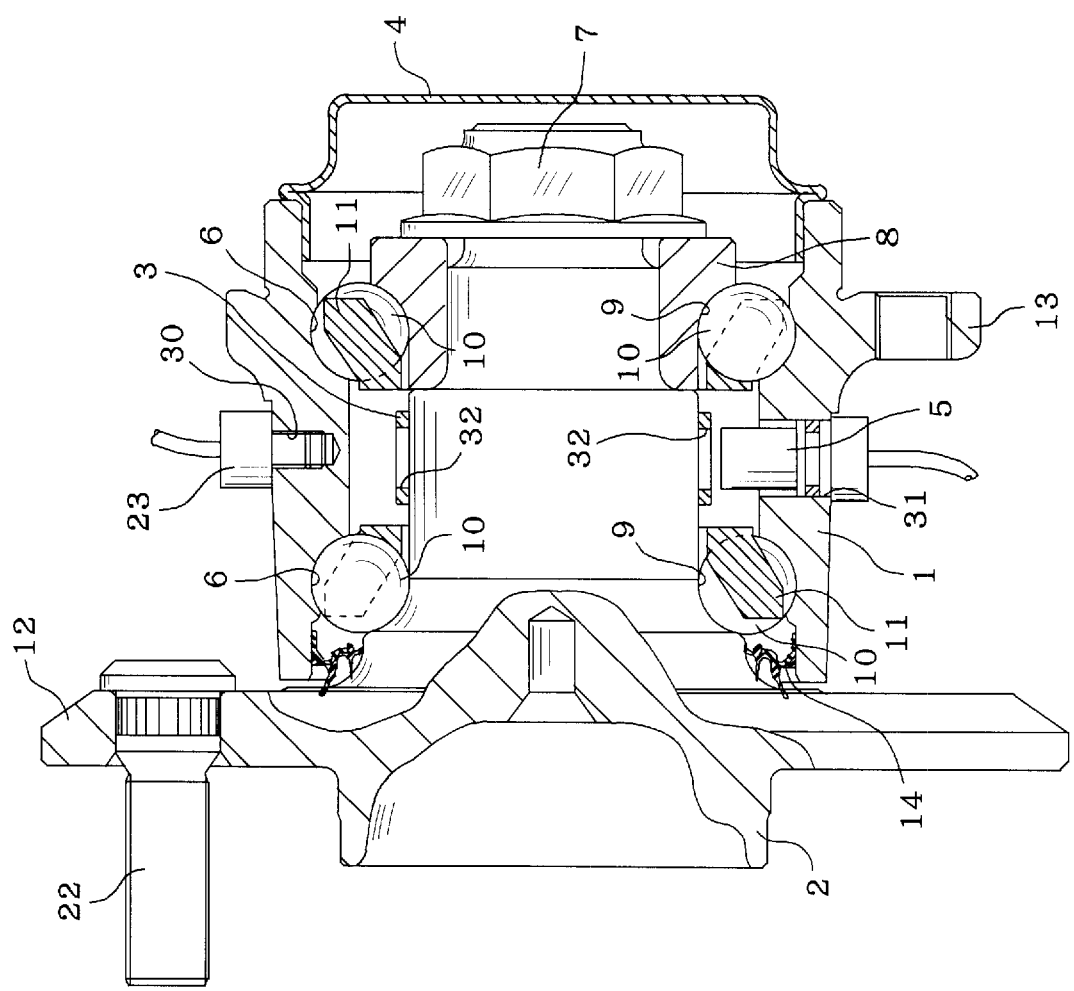
FIG. 3 is a partly cut away, cross sectional view of a rolling bearing unit according to a second example of the embodiment of the present invention.

Next, FIG. 3 shows a second example of the embodiment of the invention. In this example, an installation hole 31 is formed in the area between the pair of outer-raceways 6 in the middle in the axial direction of the outer race 1 such that it penetrates the outer race 1 in the radial direction. This installation hole 31 is formed at a position that is separated in the circumferential direction of the outer race 1 from the screw hole 30 for mounting the vibration sensor 23. In addition, a cylindrical shaped (rod shaped) rpm detection sensor 5 is mounted in the installation hole 31.

On the other hand, in the middle in the axial direction of the hub 2, a cylindrical sensor rotor 3 is fixedly fitted onto the portion between the inner-raceway 9 formed in the hub 2 itself and the inner race 8 that is fixedly fitted onto the hub 2. This sensor rotor 3 is made of magnetic metal plate such as low carbon steel plate, and formed with a plurality slit-shaped through holes 32 in the middle in the axial direction. The through holes 32 are long in the axial direction, and uniformly spaced around in the circumferential direction, so that the magnetic characteristics alternates at uniform intervals around in the circumferential direction.

In addition, the detection portion on the tip end (top end in FIG. 6) of the rpm detection sensor 5 comes close to and faces the outer surface of the sensor rotor 3. Accordingly, in this embodiment, a cover 4 that is mounted on the axially inner end of the outer race 1 only serves the purpose of covering the opening on the axially inside end of the outer race 1, and it supports no sensor. Except for the difference in the construction of the rpm detection device, the rest of the construction is similar for the first example described above.

Figure 4:
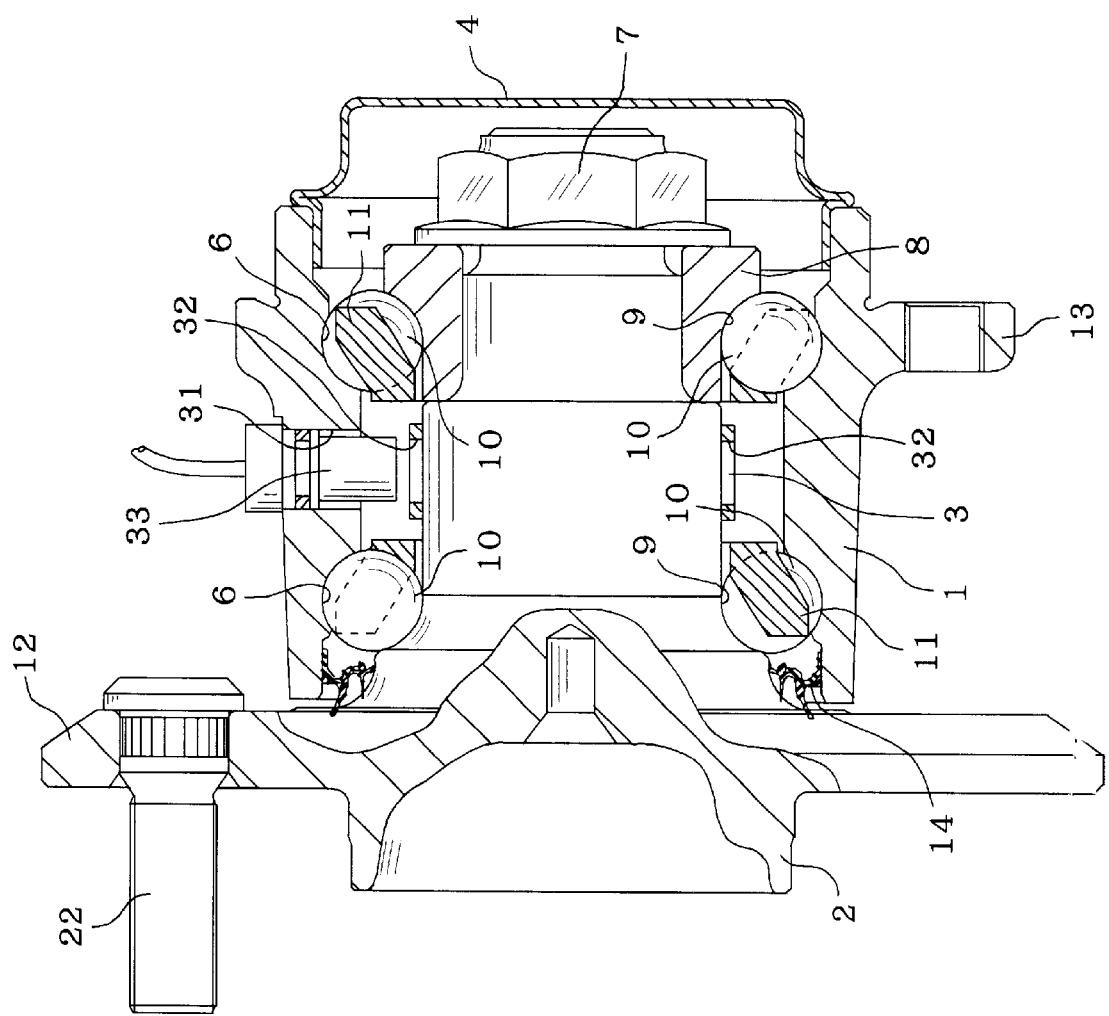
FIG. 4 is a partly cut away, cross sectional view of a rolling bearing unit according to a third example of the embodiment of the present invention.

Next, FIG. 4 shows a third example of the embodiment of the invention. In this example as well, an installation hole 31 is formed in the area between the pair of outer-raceways 6 in the middle in the axial direction of the outer race 1 such that it penetrates the outer race 1 in the radial direction. A cylindrical (rod-shaped) complex sensor 33 is mounted inside the installation hole 31. This complex sensor 33 comprises a rpm detection sensor and vibration sensor that are embedded in a single holder made of synthetic resin, and by combining it with a sensor rotor 3 that fits around the outer peripheral surface in the middle of the hub 2, it is capable of detecting the rpm of the wheel that is attached to the hub 2, as well as detect vibrations that are transmitted to the outer race 1 from the wheel. The other construction and function of this example are similar to that of the second example described above.

Figure 5:
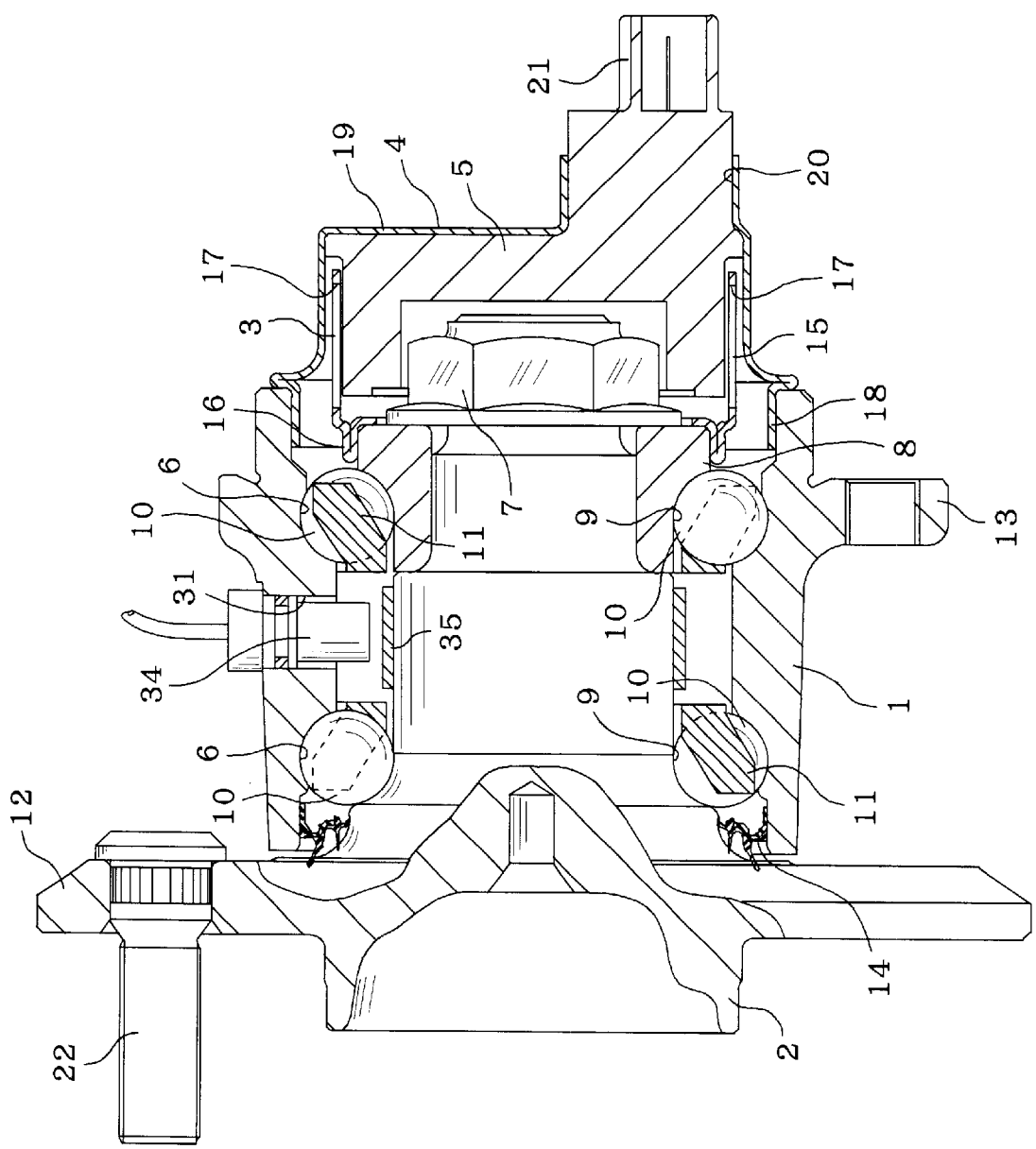
FIG. 5 is a partly cut away, cross sectional view of a rolling bearing unit according to a fourth example of the embodiment of the present invention.

Next, FIG. 5 shows a fourth embodiment of the invention. In this embodiment as well, an installation hole 31 is formed in the area between the pair of outer-raceways 6 in the middle in the axial direction of the outer race 1 such that it penetrates the outer race 1 in the vertical direction. It is desirable that the installation hole 31 is formed in the top end of the outer race 1 such that it runs nearly vertically. In addition, a cylindrical (rod-shaped) displacement sensor 34 is mounted inside the installation hole 31. On the other hand, a cylindrical, metallic sensor ring 35 is fixedly fitted onto the section between the inner-raceway 9 that is formed in the hub 2 itself, and the inner race 8 that is fixedly fitted onto the hub 2. No through holes are formed in this sensor ring 35, but rather its outer peripheral surface is a simple cylindrical surface that is concentric with the hub 2.

When the distance between the detection surface that is formed on the tip end face (bottom surface) of the displacement sensor 34, and the outer peripheral surface of the sensor ring 35, changes, the displacement sensor 34 outputs a signal that corresponds to the change. Moreover, a rpm detection sensor 5 is held in the cover 4 that covers the opening on the inner end of the outer race 1 similar to that in the second example, and similarly, a sensor rotor 3 is fittingly fastened to the end of the inner race 8 that is fastened to the hub 2 to form a rpm detection device. In the case that the portion, such as the outer peripheral surface in the middle of the hub 2 that faces the detection section of the displacement sensor 34, has sufficient shape precision such as cylindrical precision, there is no need to have a sensor ring 35.

In this example of the invention, constructed as described above, it is possible to find the load applied to the rolling-bearing unit for supporting a wheel, in which this displacement sensor 34 is installed, based on the detection signal from the displacement sensor 34. In other words, as the load of the automobile presses downward on the outer race 1 that is supported by the suspension of the automobile, the hub 2 that supports the wheel tries to stop as is in that position. Therefore, as the load increases, the displacement between the center of the outer race 1 and the center of the hub 2 becomes larger due to the elastic deformation of the outer race 1, hub 2 and rolling elements 10. In addition, the distance between the detection surface of the displacement sensor 34 formed on the top end of the outer race 1 and the outer peripheral surface of the sensor ring 35 becomes shorter as the load increases. By sending the detection signal from the displacement sensor 34 to a controller, it is possible to find the load that is applied to the rolling-bearing unit for supporting a wheel in which the displacement sensor 34 is installed, from the relational expressions that are found trough experimentation in advance.

Besides being able to perform proper ABS control based on the load applied to the rolling-bearing units for supporting each wheel, which is found in this way, it is possible to notify the operator of poor load conditions.

First, the ABS control will be explained. In the case that a non-uniform load is applied to each wheel, when hydraulic pressure of equal magnitude is applied to the wheel cylinders of each wheel during braking, a difference occurs in the braking force obtained for each wheel, aid the automobile shifts to one side braking. It then becomes impossible to maintain stable movement of the automobile. Here, different magnitude hydraulic pressure is applied to each wheel cylinder (high hydraulic pressure is applied to the wheel cylinder of a wheel to which a large load is applied), so that no difference occurs in the braking force for each wheel.

Next, notifying the operation of a poor loading condition, will be explained. The load applied to each wheel is found based on the signals from the displacement sensors 34 that are installed in the rolling-bearing units for supporting each of the wheels. The signals from the displacement sensors 34 that are installed for each of the wheels are input to a controller which calculates the load applied to each wheel. When the difference (deviation) in the loads of these wheels becomes larger than a pre-determined value (for example when the ratio between the maximum value and minimum value exceeds 1.5), the controller determines that loading is poor. By lighting up a warning light that is located near the drivers seat, a warning is sent to the operator to adjust the load. It is also possible to find the position of the center of gravity of the automobile in that condition based on the loads found for each wheel, and to display that position on a display located on the dashboard. Furthermore, in the case that the total load applied to all of the wheels exceeds the predetermined total load of the automobile, the automobile is determined to be overloaded and a warning is sent to the operator to unload some of the load.

Conventionally used in order to know the load condition of the automobile, for example in the case of a truck, is a control valve, called a load sensing valve, that adjusts the height of the automobile according to the load applied to the truck bed. Also, a height sensor is conventionally installed in some of the automobiles to keep the automobile level regardless of the load position of the automobile. However, in the case of these previously known devices, the separate control valve or height sensor is located, for example, on the bottom of the automobile, so it requires installation space, or installation may take time. Also, in addition to the cost of installation, it is impossible to avoid increased costs due to necessary measures that must be taken such as preventing damage due to splashed water or mud when driving during rainy weather. On the other hand, with this invention, the method for knowing the load condition of the automobile can be constructed at low cost.

Figure 6:
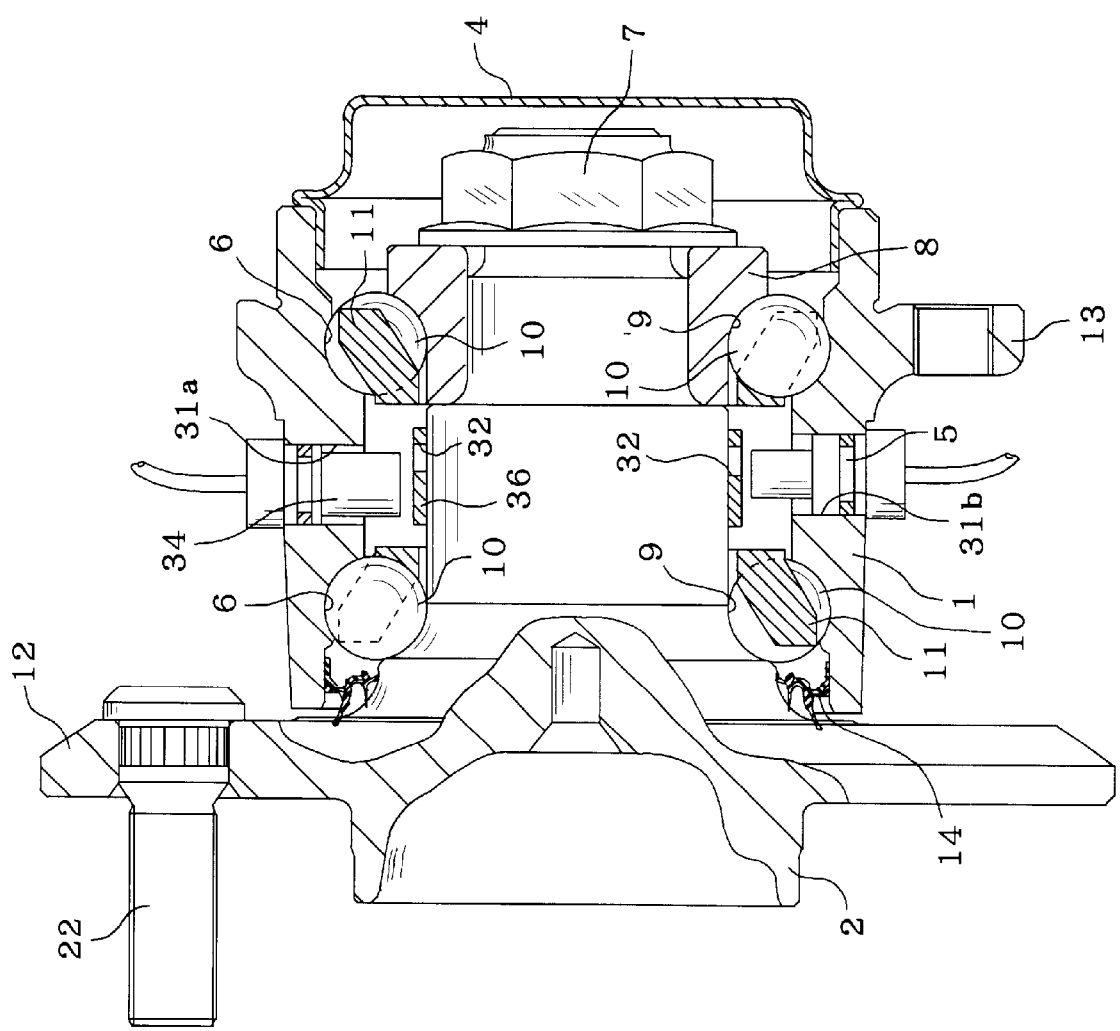
FIG. 6 is a partly cut away, cross sectional view of a rolling bearing unit according to a fifth example of the embodiment of the present invention.
Figure 7:
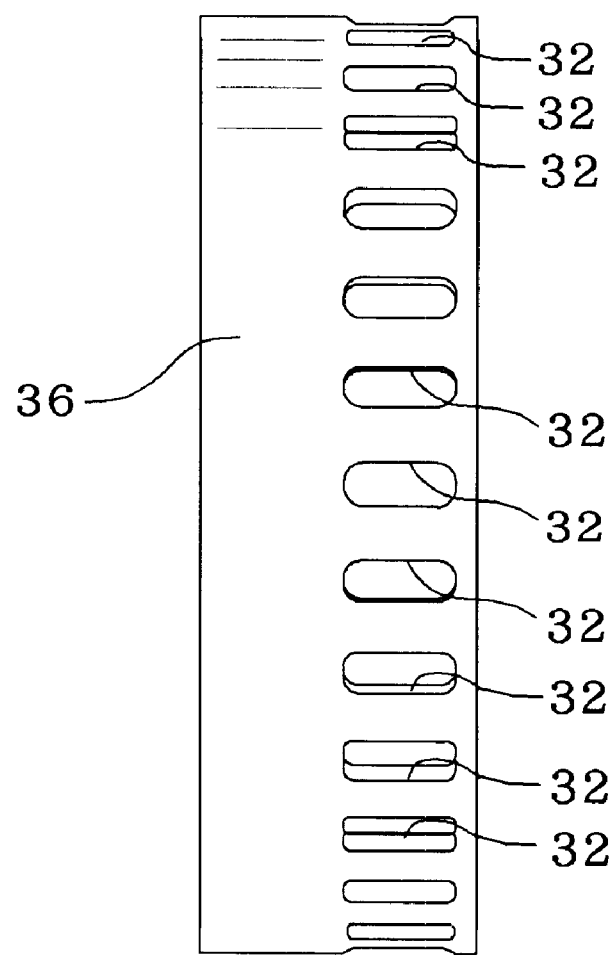
FIG. 7 is a side elevational view of a center rolling of the rolling bearing unit according to the fifth example taken in the same direction as in FIG. 6.

Next, FIGS. 6 and 7 show a fifth example of the embodiment of the invention. In this example, a pair of installation holes 31a, 31b are formed in the middle in the axial direction of the outer race 1 in the area between the pair of outer-raceways 6. These installation holes 31a, 31b are shifted out of phase in the circumferential direction, and are also shifted a little in the axial direction of the outer race 1, and they penetrate the outer race 1 in the radial direction. A displacement sensor 34 that is similar to the one described in the fourth example is inserted and attached in the installation hole 31a that is formed in the top end of the outer race 1. A cylindrical (rod-shaped) rpm detection sensor 5 is mounted in the other installation hole 31b.

On the other hand, there is a cylindrical sensor rotor ring 36 fitted around the middle in the axial direction of the hub 2 in the area between the inner-raceway 9 that is formed in the hub 2 itself, and the inner race 8 that is fitted onto the hub 2. This sensor rotor ring 36 is made of a magnetic metal plate such as low carbon steel plate, and as shown in FIG. 7, many slit-shaped through holes 32 that are long in the axial direction are formed in half of the sensor rotor ring 36 in the axial direction (right half in FIGS. 6 and 7), such that they are uniformly spaced around in the circumferential direction and such that the magnetic characteristics of the sensor rotor ring 36 alternates at uniform intervals in the circumferential direction. In addition, the outer peripheral surface of this half in the axial direction of the sensor rotor ring 36 faces very closely to the detection portion on the tip (top end in FIG. 6) of the rpm detection sensor 5. On the other hand, no through holes are formed in the other half in the axial direction (left half in FIGS. 6 and 7) of the sensor rotor ring 36, such that it forms a simple cylindrical surface whose outer peripheral surface is concentric with the hub 2. The detection surface on the tip (bottom end in FIG. 6) of the displacement sensor 34 faces this other half in the axial direction of the sensor rotor ring 36.

In this embodiment, the cover 4 that is mounted on the axially inner end of the outer race 1 only serves the purpose of covering the opening on the axially inner end of the outer race 1, and supports no sensor. Accordingly, in comparison with supporting the rpm detection sensor 5 (see FIG. 5) with the cover 4 as in the case of the fourth example, as described above, it is possible to minimize the amount that the cover 4 sticks out from the inner end of the outer race 1, and thus it is possible to reduce the dimension in the axial direction of the rolling-bearing unit for supporting a wheel. Moreover, since the sensor ring, which is combined with the displacement sensor 34, and the sensor rotor, which is combined with the rpm detection sensor 5, are combined in one integral sensor rotor ring 36, it is possible to reduce costs by simplifying parts manufacture, parts control, and assembly. The other construction and function is substantially the same as for the fourth example described above.

Figure 8:
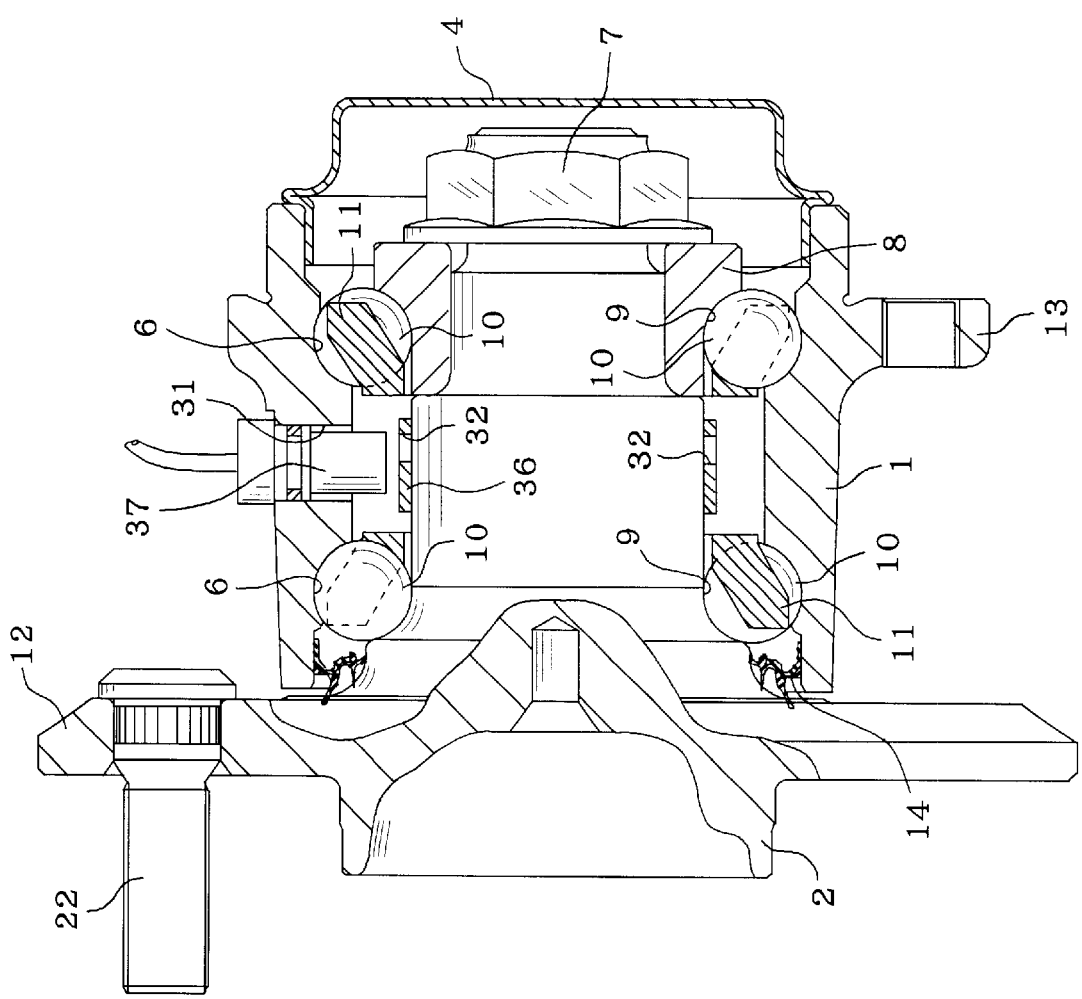
FIG. 8 is a partly cut away, cross sectional view of a rolling bearing unit according to a sixth example of the embodiment of the present invention.

Next, FIG. 8 shows a sixth example of the embodiment of the invention. In this example, only one installation hole 31 is formed in the middle in the axial direction of the outer race 1 in the area between the pair of outer-raceways 6 such that it penetrates radially the outer race 1. In addition, a cylindrical (rod-shaped) complex sensor 37 is mounted in the installation hole 31. This complex sensor 37 comprises a rpm detection sensor and displacement sensor that are embedded in a single holder made of synthetic resin, and is combined with a sensor rotor ring 36 as shown in FIG. 7, like that in the fifth example, that fits around the outer peripheral surface in the middle of the hub 2, so that it can detect the rpm of the wheel that is attached to and supported by the hub 2, as well as can calculate the load applied to this wheel. In order to do this, the detection portion of the rpm detection sensor of this complex sensor faces the plurality of through holes 32 that are formed in half of the sensor rotor ring 36, and the displacement sensor faces the simple cylindrical surface on the other half of the sensor rotor ring 36. The other construction and function is substantially the same as that of the fifth embodiment described above. It is omitted from the drawings however, it is also possible to add a vibration sensor to the displacement sensor and rpm detection sensor of the complex sensor that is held in the single holder.

Figure 9:
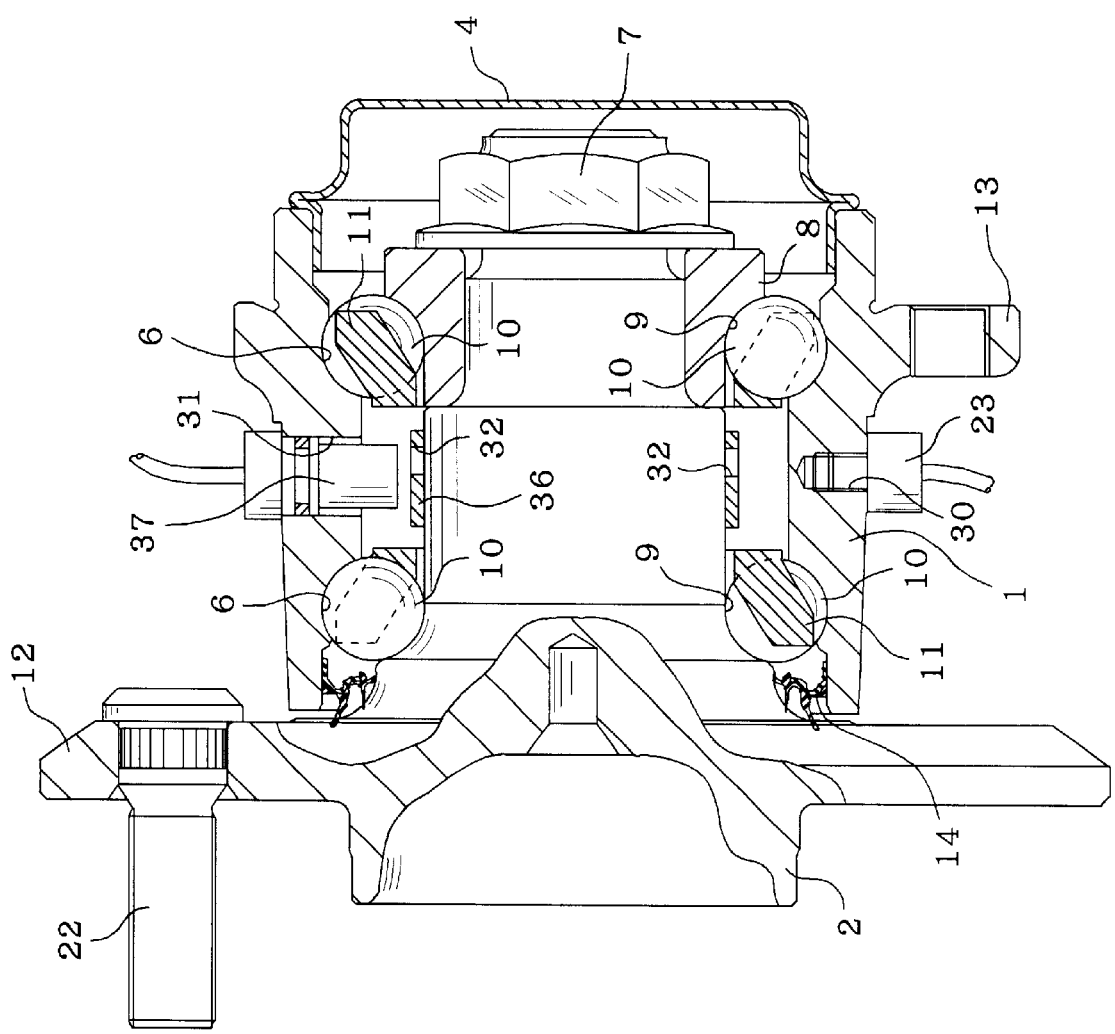
FIG. 9 is a partly cutaway, cross sectional view of a rolling bearing unit according to a seventh example of the embodiment of the present invention.

FIG. 9 shows a seventh example of the embodiment of the invention. In this example, a vibration sensor 23 is screwed into a screw hole 30 that is formed in the outer peripheral surface in the middle of the outer race 1, and it detects the vibration that is transmitted to the outer race 1 when the automobile is moving. The other construction and function are substantially the same as those of the sixth example described above.

Incidentally, when each of the sensors used is provided with an independent harness which is constructed to transmit a separate detection signal, the increased number of harnesses leads to cost-tip and weight and to inconvenient work of design. Particularly, in the case where a plurality of sensors are installed in the rolling bearing unit for supporting an automobile wheel, the weight of the harness is the unspring weight, which may worsen the automobile performance that is mainly the comfortable feeling of riding. In addition, the connector provided adjacent to the rolling bearing unit and the plug adjacent to the harness are of a large size, which makes it difficult to secure the space for setting the connector and plug.

Such problems are solved by having a single harness which can transmit a plurality of kinds of detection signals, while the number of the harnesses is reduced.

Figure 10:
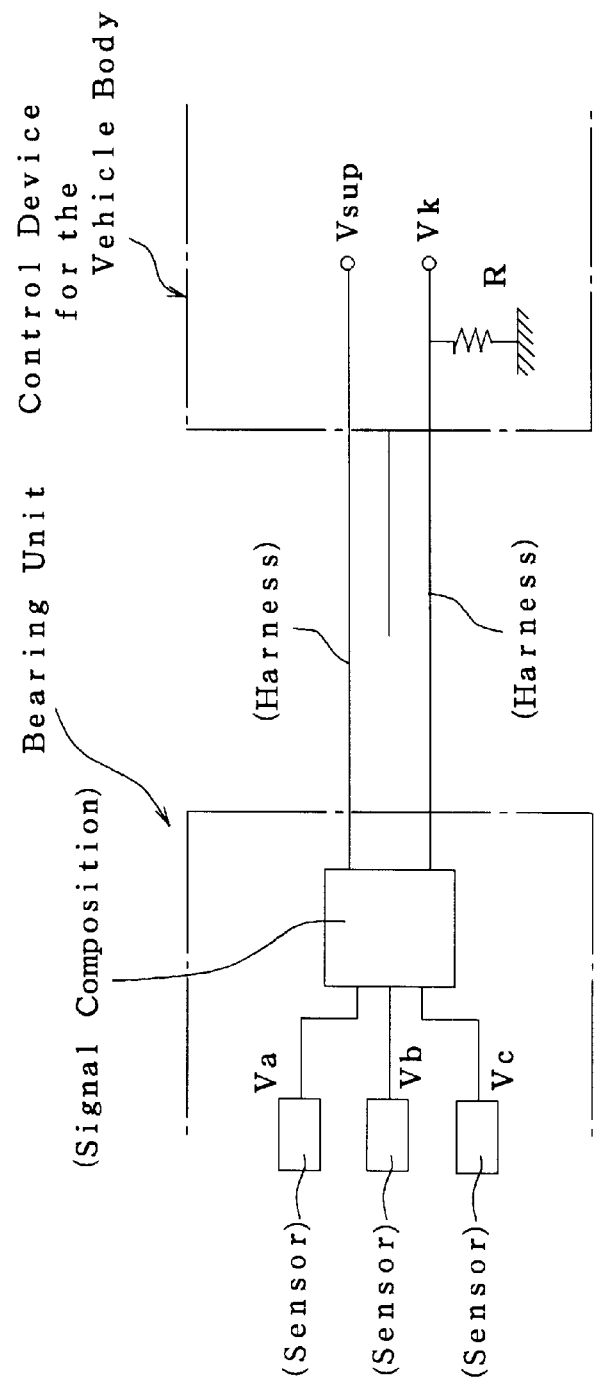
FIG. 10 is a diagram showing a signal transmission in the present invention.

FIG. 10 shows a method of transmitting signals, wherein independent signals sent from sensors are compounded before being sent to a control device. In such a method for transmitting sensor detection signals, detection signals output from sensors are mixed to be sent through a single signal line to the control device before they are separated to each signal corresponding to the defection signal of each sensor in the control device.

By way of transmission method of sensor detection signal as constructed above, kinds of detection signals can be transmitted through a single set of harness, that is a signal line, and therefore the number of harnesses, and therefore the cost and weight can be decreased and the design to provide the harness can be feasible.

The rolling-bearing unit for supporting a wheel of this invention is constructed and functions as described above, and by detecting in advance the causes for losing stability while the automobile is running and making it possible to correspond to those causes, it can contribute to safe driving of the automobile.

What is claimed is:

1. A rolling bearing unit for supporting a wheel, comprising a stationary race, a rotatable race, rolling members, a sensor ring supported by the rotatable race, a sensor rotor supported by the rotatable race and having circumferential characteristics changing alternately, a displacement sensor supported by the stationary race and having a detection portion facing the sensor ring, and a rotation speed sensor supported by the stationary race and having a detection portion facing the sensor rotor.

2. The rolling bearing unit of claim 1 wherein a detection signal output from the displacement sensor is sent to a controller for performing anti-lock brake system control.

3. The rolling bearing unit of claim 1 wherein the rotatable race includes a hub having a flange formed on a portion of the hub that protrudes in an axial direction from an axially outer end of the stationary race and wherein the stationary race includes an installation section for attaching the stationary race to a suspension of an automobile.

4. The rolling bearing unit of claim 1 in combination with a wheel of a vehicle mounted thereon.

5. The rolling bearing unit of claim 4 wherein the vehicle is an automobile.

6. The rolling bearing unit of claim 1 in combination with a suspension of a vehicle mounted thereon.

7. The rolling bearing unit of claim 6 wherein the vehicle is an automobile.

8. The rolling bearing unit of claim 1 in combination with a wheel of a vehicle and a suspension of a vehicle, the wheel and the suspension mounted to the rolling bearing unit.

9. A rolling bearing unit for supporting a wheel, comprising a stationary race, a rotatable race, rolling members, a sensor ring supported by the rotatable race, a sensor rotor supported by the rotatable race and having circumferential characteristics changing alternately, a vibration sensor supported by the stationary race, a displacement sensor supported by the stationary race and having a detection portion facing the sensor ring, and a rotation speed sensor supported by the stationary race and having a detection portion facing the sensor rotor.

10. The rolling bearing unit of claim 9 in combination with a wheel of a vehicle mounted thereon.

11. The rolling bearing unit of claim 9 in combination with a suspension of a vehicle mounted thereon.

12. A rolling bearing unit for supporting a wheel, comprising a stationary race having a stationary peripheral surface formed with a stationary raceway, being not rotatable during use, and supported by a suspension, a rotatable race having a rotatable peripheral surface formed with a rotatable raceway, being rotatable with the wheel fixed thereto, rolling elements rotatably provided between the stationary raceway and rotatable raceway, a vibration sensor supported by the stationary race, a sensor rotor supported by the rotatable race and having circumferential characteristics changing alternately and a rotation speed sensor supported by the stationary race and having a detection portion facing the sensor rotor, wherein a detection signal output from the vibration sensor is sent to a controller for performing anti-lock brake system control or traction control system control.

13. The rolling bearing unit of claim 12 wherein the detection signal is used for feed forward control.

14. A rolling bearing unit for supporting a wheel, comprising a stationary race having a stationary peripheral surface formed with a stationary raceway, being not rotatable during use, and supported by a suspension, a rotatable race having a rotatable peripheral surface formed with a rotatable raceway, being rotatable with the wheel fixed thereto, rolling elements rotatably provided between the stationary raceway and rotatable raceway, a vibration sensor supported by the stationary race, a sensor rotor supported by the rotatable race and having circumferential characteristics changing alternately and a rotation speed sensor supported by the stationary race and having a detection portion facing the sensor rotor, wherein the rotatable race includes a hub having a flange formed on a portion of the hub that protrudes in an axial direction from an axially outer end of the stationary race and wherein the stationary race includes an installation section for attaching the stationary race to the suspension of an automobile.

15. A rolling bearing unit for supporting a wheel, comprising a stationary race having a stationary peripheral surface formed with a stationary raceway, being not rotatable during use, and supported by a suspension, a rotatable race having a rotatable peripheral surface formed with a rotatable raceway, being rotatable with the wheel fixed thereto, rolling elements rotatably provided between the stationary raceway and rotatable raceway, a vibration sensor supported by the stationary race, a sensor rotor supported by the rotatable race and having circumferential characteristics changing alternately and a rotation speed sensor supported by the stationary race and having a detection portion facing the sensor rotor, in combination with a wheel of a vehicle mounted thereon wherein the vehicle is an automobile.

16. A rolling bearing unit for supporting a wheel, comprising a stationary race having a stationary peripheral surface formed with a stationary raceway, being not rotatable during use, and supported by a suspension, a rotatable race having a rotatable peripheral surface formed with a rotatable raceway, being rotatable with the wheel fixed thereto, rolling elements rotatably provided between the stationary raceway and rotatable raceway, a vibration sensor supported by the stationary race, a sensor rotor supported by the rotatable race and having circumferential characteristics changing alternately and a rotation speed sensor supported by the stationary race and having a detection portion facing the sensor rotor, in combination with a suspension of a vehicle mounted thereon wherein the vehicle is an automobile.

17. A rolling bearing unit for supporting a wheel, comprising a stationary race having a stationary peripheral surface formed with a stationary raceway, being not rotatable during use, and supported by a suspension, a rotatable race having a rotatable peripheral surface formed with a rotatable raceway, being rotatable with the wheel fixed thereto, rolling elements rotatably provided between the stationary raceway and rotatable raceway, a vibration sensor supported by the stationary race, a sensor rotor supported by the rotatable race and having circumferential characteristics changing alternately and a rotation speed sensor supported by the stationary race and having a detection portion facing the sensor rotor, in combination with a wheel of an automobile and a suspension of the automobile, the wheel and the suspension mounted to the rolling bearing unit.

* * * * *